(12) United States Patent  (10) Patent No.: US 8,418,148 B2
Shafi et al.  (45) Date of Patent: Apr. 9, 2013

(54) THREAD EXECUTION ANALYZER

(75) Inventors: Hazim Shafi, Redmond, WA (US);
Brian Adelberg, Issaquah, WA (US);
Khaled S. Sedky, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 860 days.

(21) Appl. No.: 12/394,445

(22) Filed: Feb. 27, 2009

(65) Prior Publication Data
US 2010/0223600 A1  Sep. 2, 2010

(51) Int. Cl.
*G06F 9/45*  (2006.01)
(52) U.S. Cl. ......... 717/131; 717/141; 717/143; 717/154
(58) Field of Classification Search .................. None
See application file for complete search history.

(56) References Cited

U.S. PATENT DOCUMENTS

| | | | |
|---|---|---|---|
| 5,297,274 A | 3/1994 | Jackson | |
| 6,226,787 B1 | 5/2001 | Serra et al. | |
| 7,137,120 B2 | 11/2006 | Armstrong et al. | |
| 7,343,476 B2 | 3/2008 | Floyd et al. | |
| 7,353,370 B2 | 4/2008 | Rodgers et al. | |
| 7,426,731 B2 | 9/2008 | Findeisen | |
| 2007/0220513 A1 | 9/2007 | Hwang | |
| 2007/0250820 A1* | 10/2007 | Edwards et al. | 717/131 |
| 2008/0189488 A1 | 8/2008 | DeWitt et al. | |
| 2009/0319996 A1* | 12/2009 | Shafi et al. | 717/125 |

OTHER PUBLICATIONS

"ThreadX", retrieved at <<http://rtos.com/page/product.php?id=2>>, pp. 6.
"Graphical Thread Dumps", retrieved at <<http://neuroning.com/articles/2005/11/24/graphical-thread-dumps>>, Nov. 25, 2005, pp. 3.

* cited by examiner

*Primary Examiner* — Chuck Kendall

(57) ABSTRACT

A thread execution analyzer analyzes blocking events of threads in a program using execution data and callstacks collected at the blocking events. The thread execution analyzer attempts to identify an application programming interface (API) responsible for each blocking event and provides blocking analysis information to a user. The blocking analysis information may be used by a developer of the program to understand the causes of blocking events that occur for threads of the program.

20 Claims, 5 Drawing Sheets

THREAD EXECUTION ANALYZER

BACKGROUND

Computer programs may be written to allow different portions (e.g., threads) of the program to be executed in parallel. One challenge of parallel programming involves understanding the sources of program execution inefficiencies. When a parallel program is written using multiple processes or threads of execution, it may be difficult to measure the impact of the processes on one another. In addition, it may be difficult to determine the root causes and total duration of delays and relate the delays to the underlying program being studied.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A thread execution analyzer analyzes blocking events of threads in a program using execution data and callstacks collected at the blocking events. The thread execution analyzer attempts to identify an application programming interface (API) responsible for each blocking event and provides blocking analysis information to a user. The blocking analysis information may be used by a developer of the program to understand the causes of blocking events that occur for threads of the program.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
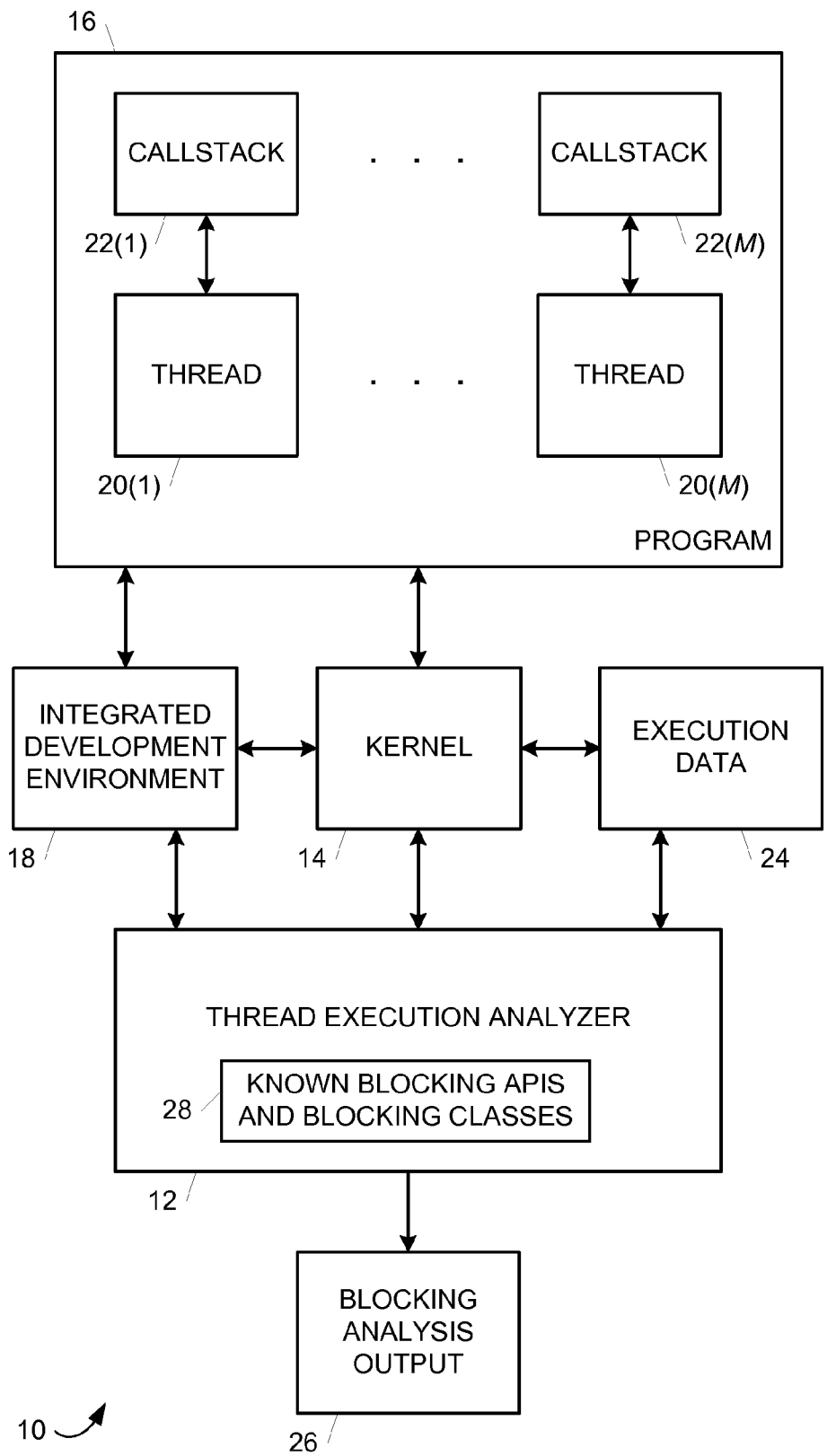
FIG. 1 is a block diagram illustrating an embodiment of a thread execution analyzer.

FIG. 1 is a block diagram illustrating an embodiment of a thread execution analyzer 12 in a runtime environment 10. Runtime environment 10 represents a runtime mode of operation in one or more computer systems, such as a computer system 100 shown in FIG. 7 and described in additional detail below, where the computer system or systems are executing instructions. The computer system or systems generate runtime environment 10 from a kernel 14 and any runtime libraries (not shown) executed by the computer system to allow thread execution analyzer 12 and a program 16 to be executed.

Thread execution analyzer 12 is executed by the computer system to analyze the execution of threads 20(1)-20(M) in program 16, where M is an integer that is greater than or equal to one. Program 16 includes subsets of instructions that are configured into one or more threads 20. Each thread 20 forms a sequence of instructions that is configured to perform one or more functions of program 16 when executed. Threads 20 may be executed sequentially or concurrently in the computer system during the execution of program 16. For example, threads 20 may be executed sequentially in a computer system with a single processing resource (e.g., a single processor with a single execution core) and may be executed concurrently in a computer system with multiple processing resources (e.g., multiple execution cores in a single processor or multiple processors each with one or more execution cores). Threads 20 may interact with one another to exchange data and/or to synchronize.

At any given point in the execution of threads 20(1)-20(M), corresponding callstacks 22(1)-22(M) may be collected. Each callstack 22 stores a collection of instruction return addresses and is described in additional detail with reference to FIG. 3 below. Thread execution analyzer 12 uses callstacks 22 as a diagnostic tool to understand the hierarchy of program instructions traversed by threads 20 through function calls and report the root cause of thread blocking events when able. Each callstack 22 starts with a starting function and terminates with a return address from the last function call that was made in one embodiment.

Thread execution analyzer 12 interacts with kernel 14 to cause execution data 24 corresponding to program 16 to be stored each time a context switch (i.e., a kernel scheduling event) occurs with a thread 20. As used herein, a context switch is an operation where kernel 14 interacts with a thread 20 to pause execution (i.e., block) or resume execution (i.e., unblock). Kernel 14 schedules threads 20 for execution on processing resources of the computer system. In response to a thread 20 becoming blocked during execution, kernel 14 may perform a context switch to pause the execution of the blocked thread 20 and begin execution of another new or unblocked thread 20. After the blocked thread 20 becomes unblocked, kernel 14 causes the execution of the thread 20 to be resumed by rescheduling the thread 20 on an available processing resource. Kernel 14 may also preempt (i.e., block) an executing thread 20 to allow another thread 20 to execute. Kernel 14 stores information that describes each context switch in execution data 24 as described in additional detail below.

Thread execution analyzer 12 accesses execution data 24 to identify when each thread 20(1)-20(M) blocked and unblocked during execution. Thread execution analyzer 12 uses an analysis of corresponding callstacks 22(1)-22(M) collected at context switches and stored in execution data 24 to correlate blocking events with classes of blocking causes. Using the callstacks 22 in execution data 24, thread execution analyzer 12 may identify application programming interfaces (APIs) that cause threads 20 to block using a set of known blocking APIs and blocking classes 28 included with or otherwise accessible to thread execution analyzer 12. Thread execution analyzer 12 assigns a blocking class associated with a blocking API to the blocking event. If thread execution analyzer 12 is unable to identify an API that caused a thread 20 to block, then thread execution analyzer 12 may assign a generic blocking class provided by kernel 14 to the blocking event. Thread execution analyzer 12 generates a blocking analysis output 26 to provide the results of the analysis to a developer or other user of program 16 in graphical and/or report formats. Accordingly, thread execution analyzer 12 may be used as a development tool that allows a developer or other user of program 16 to understand the causes of blocking events that occur for threads 20.

Kernel 14 manages the processing and other resources of the computer system or systems and provides a set of functions that allow thread execution analyzer 12, program 16, and other programs and processes in the computer system (not shown) to access and use the resources. Depending on the type and/or configuration of the computer system that generates runtime environment 10, kernel 14 may include firmware, an operating system (OS), a hypervisor, or another suitable execution platform for the computer system.

In one embodiment, thread execution analyzer 12 may be included as part of an integrated development environment (IDE) 18. IDE 18 is executable by the computer system to provide tools for software development. The tools may include a source code editor, a source code analyzer, a compiler and/or interpreter, a debugger, a profiler, a version controller, a class browser, and/or an object inspector. The tools may also include tools to automate the building a complete program from libraries and other components and/or tools to help create a graphical user interface. IDE 18 may support one or more programming languages and may be used by a developer to write, execute, debug, and analyze program 16. In other embodiments, thread execution analyzer 12 may be separate and independent from IDE 18.

Figure 2:
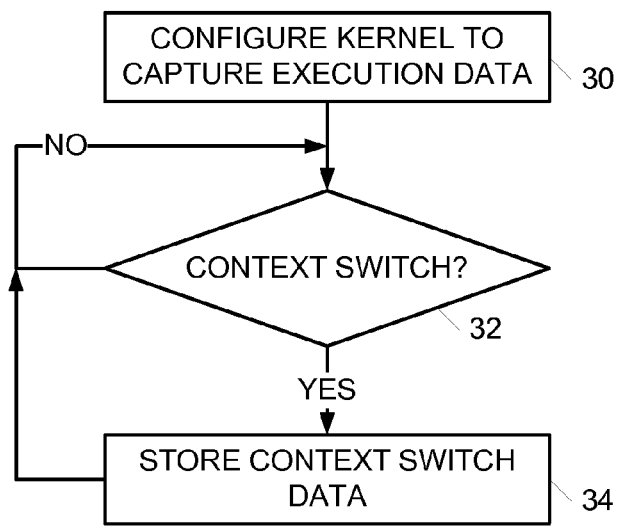
FIG. 2 is a flow chart illustrating an embodiment of a method for generating execution data for thread execution analysis.

FIG. 2 is a flow chart illustrating an embodiment of a method for generating execution data 24 for analysis by thread execution analyzer 12. The method of FIG. 2 will be described with reference to FIG. 1 where the functions are performed by any suitable combination of thread execution analyzer 12, kernel 14, and IDE 18.

In FIG. 2, kernel 14 is configured to capture execution data 24 for program 16 as indicated in a block 30. In one embodiment, thread execution analyzer 12 registers with kernel 14 to configure kernel 14 to generate execution data 24 at each context switch that occurs with threads 20. In other embodiments, a user or IDE 18 may configure kernel 14 or kernel 14 may be configured automatically or by default to capture execution data 24.

Thread execution analyzer 12 may configure kernel 14 to begin generating execution data 24 anytime before or during the execution of program 16. Thread execution analyzer 12 may also configure kernel 14 to stop generating execution data 24 prior to the completion of program 16. Accordingly, kernel 14 may capture execution data 24 for the entire execution of program 16 or for selected portions of the execution of program 16. The execution of program 16 may be started by a user, thread execution analyzer 12, or IDE 18.

Each time that kernel 14 performs a context switch as indicated in a block 32, kernel 14 stores context switch data into execution data 24 as indicated in a block 34. Kernel 14 may continue to store execution data 24 at each context switch until otherwise configured by thread execution analyzer 12.

Figure 3:
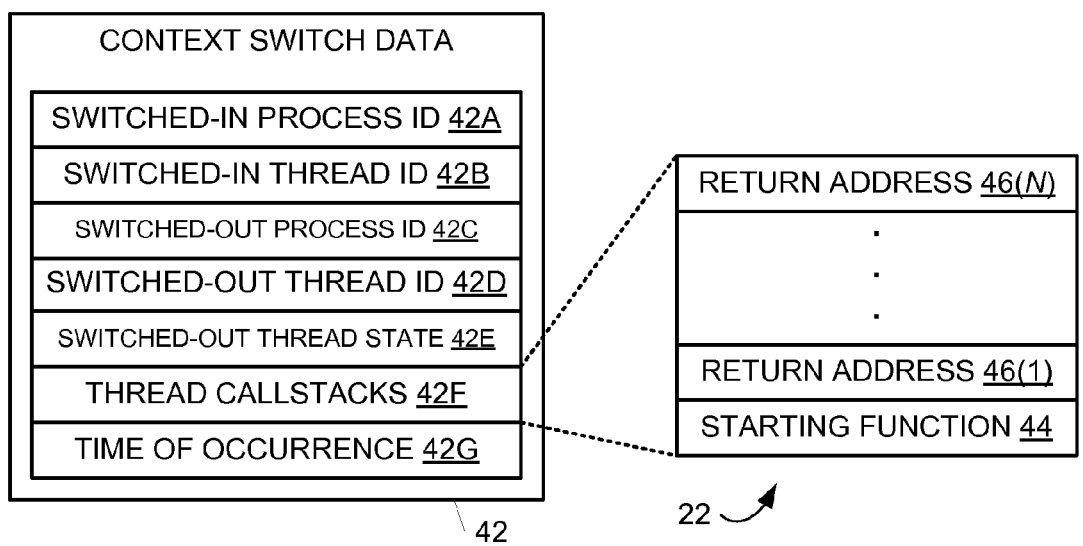
FIG. 3 is a block diagram illustrating an embodiment of execution data generated for thread execution analysis.

FIG. 3 is a block diagram illustrating an embodiment of context switch data 42 stored by kernel 14. In the embodiment of FIG. 3, context switch data 42 includes a switched in process identifier (ID) 42A that identifies the program (i.e., program 16 or another program (not shown)) with a thread 20 being switch in and a switched in thread identifier (ID) 42B that identifies the thread 20 being switched in (i.e., starting or resuming) by kernel 14 for execution by the computer system. Context switch data 42 also includes a switched out process identifier (ID) 42C that identifies the program (i.e., program 16 or another program (not shown)) with a thread 20 being switch out and a switched out thread identifier (ID) 42D that identifies the thread 20 being switched out (i.e., pausing or completing) by kernel 14 for execution by the computer system. Context switch data 42 further includes a switched out thread state 42E which indicates a state of the thread 20 being switched out as determined by kernel 14. Switched out thread state 42E may provide an indication of the reason why the thread 20 is being switched out in some embodiments (e.g., page fault, preemption, input/output (I/O), sleeping, and user request). In addition, context switch data 42 includes thread callstacks 42F, which contain the callstacks 22 of the threads 20 being switched in and switched out at the time of the context switch, and a time of occurrence 42G which indicates a time of the context switch. For each stored callstack 22, callstacks 42F include a starting function 44 and a collection of return addresses 46(1)-46(N) of the corresponding thread 20 where N is greater than or equal to zero.

Thread execution analyzer 12 may begin analyzing program 16 or a portion thereof in response to detecting that program 16 or the portion thereof has finished executing. Thread execution analyzer 12 may automatically detect that all or a portion of program 16 has finished executing, may be notified by kernel 14 and/or IDE 18 that all or a portion of program 16 has finished executing, or may be executed by a user to analyze execution data 24 after all or a portion of program 16 has finished executing.

Figure 4:
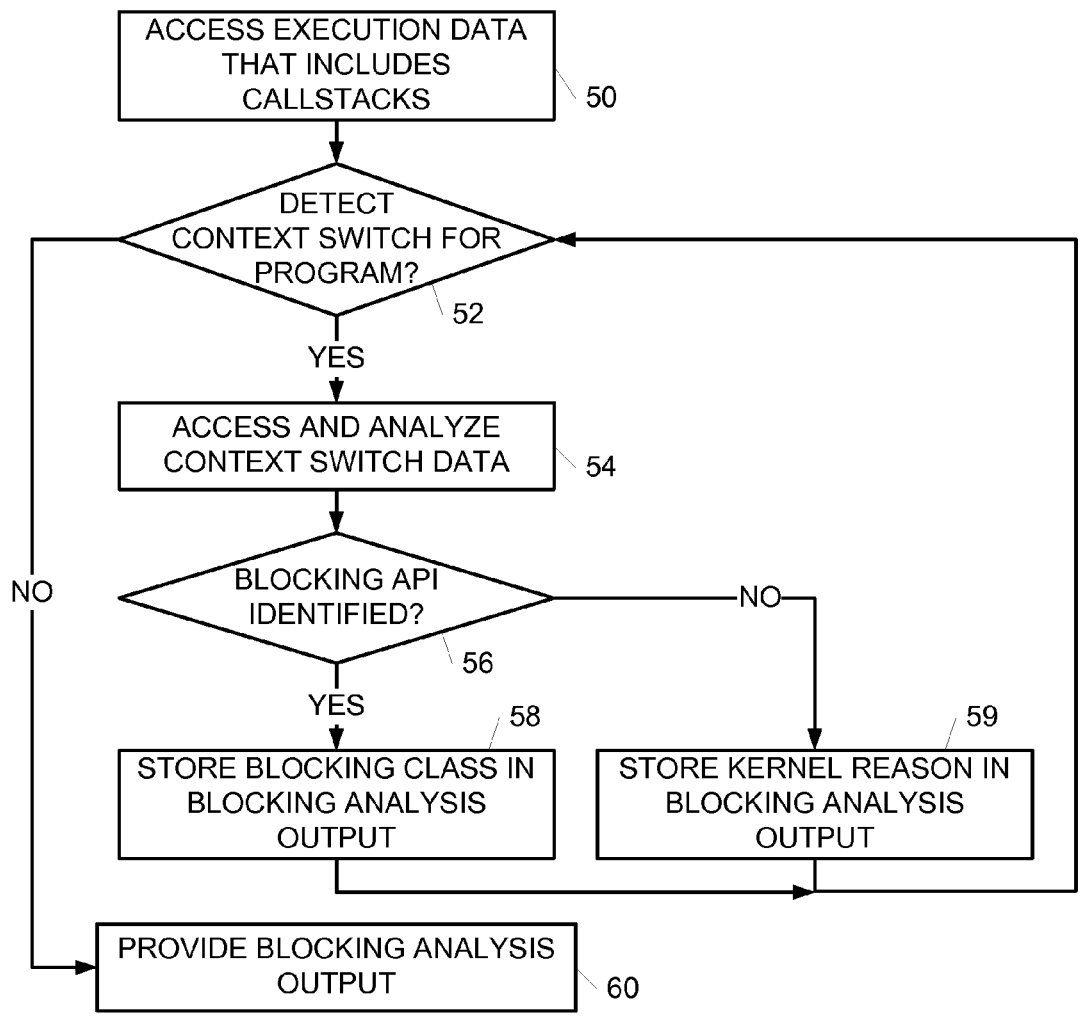
FIG. 4 is a flow chart illustrating an embodiment of a method for analyzing thread execution.

FIG. 4 is a flow chart illustrating an embodiment of a method for analyzing the execution of threads 20. The method of FIG. 4 will be described with reference to FIG. 1 where the functions are performed by thread execution analyzer 12. The functions of FIG. 4 may be performed during and/or subsequent to the execution of program 16.

In FIG. 4, thread execution analyzer 12 accesses execution data 24 that includes context switch data 42 with corresponding callstacks 42F for each context switch recorded by kernel 14 as indicated in a block 50. Thread execution analyzer 12 identifies context switches involving program 16 using switched in process ID 42A and switched out process ID 42C in each set of context switch data 42 as indicated in a block 52. For each context switch involving program 16, thread execution analyzer 12 accesses and analyzes corresponding context switch data 42 in execution data 24 as indicated in a block 54.

Thread execution analyzer 12 identifies the threads 20 involved in the context switch using thread IDs 42B and 42D and notes the time 42G of the context switch for each thread 20.

Thread execution analyzer 12 accesses the callstacks 22 in thread callstacks 42F to attempt to identify an API that caused the switched out thread 20 to block as indicated in a block 56. Thread execution analyzer 12 analyzes callstacks 22 by attempting to match stack frames (i.e., return addresses 46), after symbol resolution, to the set of known blocking API signatures and blocking classes 28 that are used to identify the class or classes of blocking events encountered by the switched out thread 20. Using the state 42E and the thread callstacks 42F, thread execution analyzer 12 matches the blocking event associated with the context switch to either a blocking class associated with the blocking API where a match to a known blocking API is found or a reason provided by kernel 14 (i.e., the state 42E).

Thread execution analyzer 12 takes each frame in the callstack 22 and performs symbol resolution to attempt to translate the binary return addresses into the module (e.g., dynamic linked library) name, the file name, the function name, and, in some embodiments, the line number in program 16 of the blocking API. Thread execution analyzer 12 attempts to match each symbol resolved stack frame in the callstack 22 to a signature in known blocking API signatures and blocking classes 28. Each signature in known blocking API signatures 28 represents an API that can result in blocking (e.g., file I/O, synchronization, processing kernel messages, and page faults, etc.) of a thread 20 and may include the file name and the function name in one embodiment. Each signature is also associated with a blocking class that is stored in known blocking API signatures and blocking classes 28 along with the signature. A user may add known blocking API signatures and classes to the set of known blocking API signatures and blocking classes 28.

For each symbol resolved stack frame that matches a known blocking API signature, thread execution analyzer 12 assigns the blocking class associated with the blocking API to the blocking event of the thread 20 and stores the blocking class with the blocking event in blocking analysis output 26 as indicated in a block 58. If no match to a known blocking API is found, thread execution analyzer 12 stores the reason provided by kernel 14 (i.e., the state 42E) with the blocking event in blocking analysis output 26 as indicated in a block 59.

Figure 5:
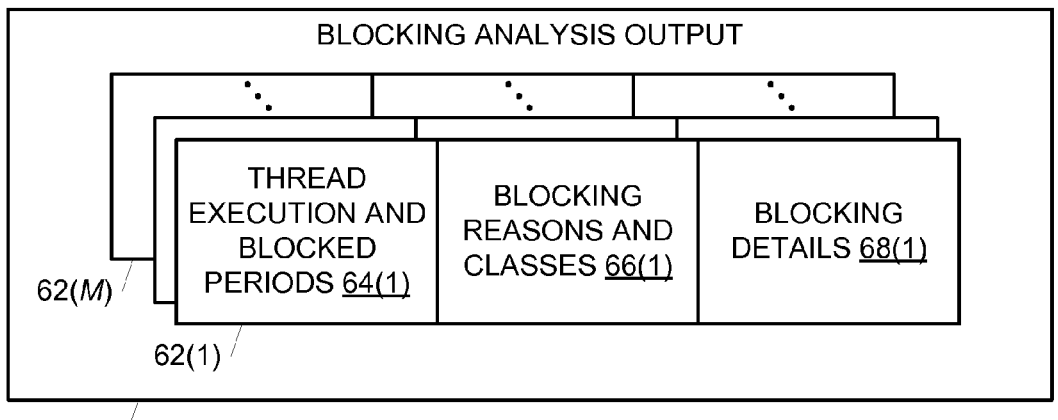
FIG. 5 is a block diagram illustrating an embodiment of a blocking analysis output.

FIG. 5 is a block diagram illustrating an embodiment of a blocking analysis output 26. In the embodiment of FIG. 5, thread execution analyzer 12 generates thread execution analyses 62(1)-62(M) that correspond to respective threads 20(1)-20(M) that are executed in program 16. Each thread execution analysis 62 includes a listing of thread execution and blocked periods 64 that indicate the periods of time when a thread 20 was executing and the periods of time when the thread 20 was blocked. Thread execution analysis 62 also includes a list of blocking reasons and classes 66 where the list includes the reason provided by kernel 14 (i.e., the state 42E) or a blocking class associated with a known blocking API for each blocking event corresponding to a blocked period in the listing of thread execution and blocked periods 64. Thread execution analysis 62 further includes a list of blocking details 68 where the list includes details of each blocking event corresponding to a blocked period. The details may include the callstack 22, or selected portions thereof, at the blocking event, the blocking API, a line number in program 16 of the blocking API, and reports based on callstacks 22. The reports based on callstacks 22 may accumulate the number of instances and total blocking time per execution callstack 22 in order to provide a user with a summary of where the most delays occur in program 16.

Thread execution analyzer 12 continues analyzing context switches using execution data 24 until all context switches for program 16 have been analyzed. After all context switches have been analyzed, thread execution analyzer 12 provides blocking analysis output 24 to a user as indicated in a block 60. Thread execution analyzer 12 may provide blocking analysis output 60 to a user in any suitable format that includes any suitable combination of graphical and/or textual information. An embodiment that provides blocking analysis output 60 to a user in a visual representation 70 will now be described with reference to FIG. 6.

Figure 6:
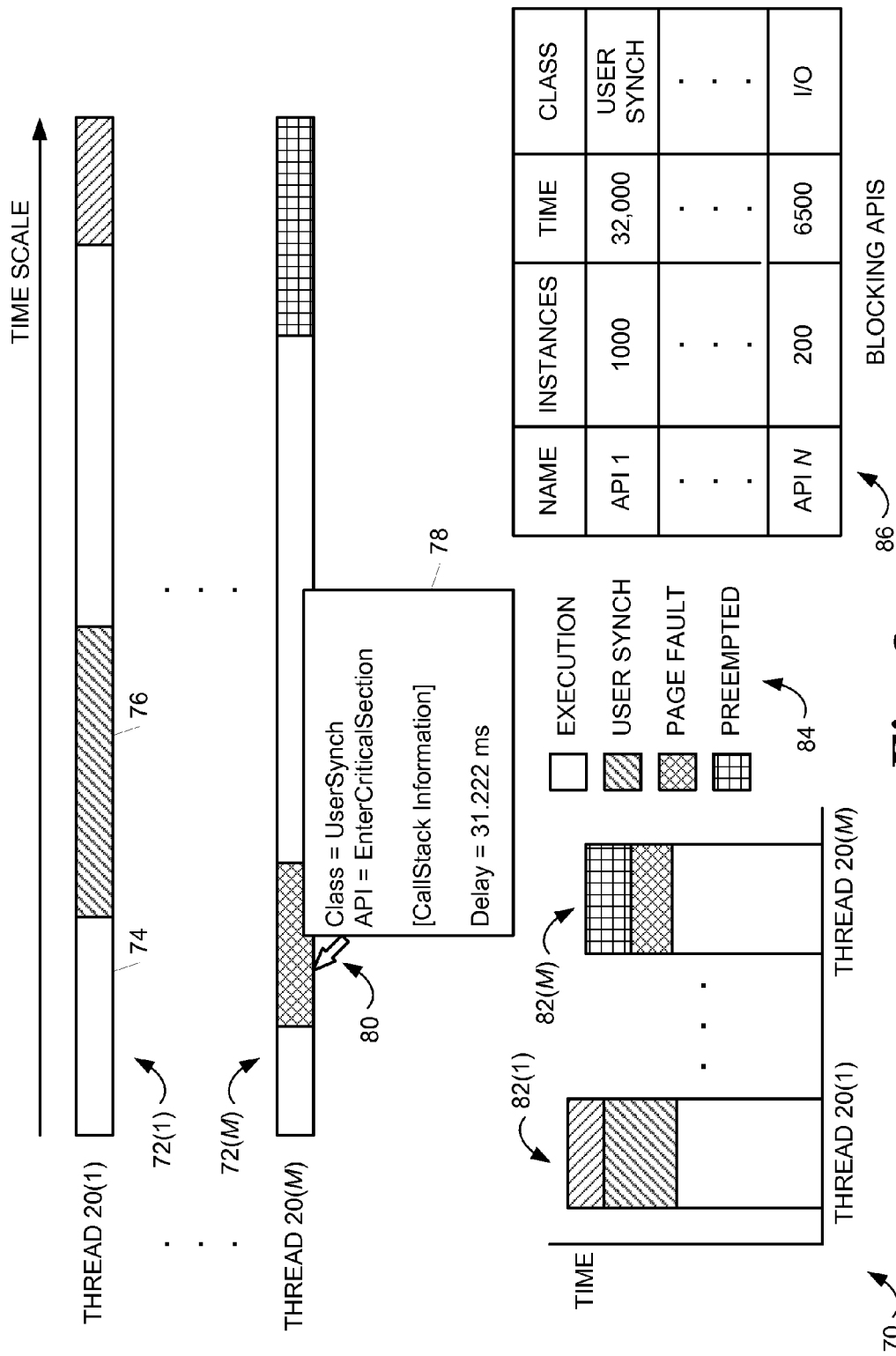
FIG. 6 is a block diagram illustrating an embodiment of blocking analysis output format.

As shown in FIG. 6, thread execution analyzer 12 provides graphical timelines 72(1)-72(M) for respective threads 20(1)-20(M). Thread execution analyzer 12 derives each timeline 72 from the corresponding thread execution analysis 62. Each timeline 72 depicts periods of execution 74 (unshaded in FIG. 6) and periods of blocking 76 (shaded in FIG. 6) in the chronological order encountered by threads 20. The different shades of the periods of blocking 76 correspond to different reasons for the blocking of the threads 20. The different shades may represent different colors or other visual differences in visual representation 70 to highlight the different blocking reasons. Timelines 72 may be adjusted by a user to show the entire period of execution of program 16 or one or more selected periods of execution of program 16.

Thread execution analyzer 12 also provides a tool tip 78 in response to an input from a user. The input may be positioning a selector (e.g., a mouse pointer) 80 in proximity to a period of blocking 76 or selecting the period of blocking 76 with a mouse or keyboard. Tool tip 78 displays details of the blocking event including the class of blocking event, the blocking API, callstack information, and a duration of the period of blocking 76. The callstack information explains what program 16 was executing so that a user can open the file that includes program 16 and examine the details of the behavior of program 16 that resulted in the blocking event.

In addition, thread execution analyzer 12 provides aggregate time graphs 82(1)-82(M) for respective threads 20(1)-20(M). Each graph 82 indicates the total amount of execution time and blocking time in each of the blocking classes. A legend 84 describes the different shades of the periods of execution and blocking. The different shades may represent different colors or other visual differences in visual format 70 to highlight the amount of execution time and blocking time for each blocking reason. Graphs 82 may be adjusted by a user to show execution and blocking times for the entire period of execution of program 16 or one or more selected periods of execution of program 16. Graphs 82 may also be adjusted by a user to show execution and blocking times for all threads 20(1)-20(M) of program 16 or one or more selected threads 20(1)-20(M) of program 16. Thread execution analyzer 12 adjusts the display of graphs 82 in response to user inputs that indicate the execution and blocking times and/or threads to be displayed.

Thread execution analyzer 12 further provides a report 86, collated by callstacks 22, that lists the blocking APIs, the number of instances that each blocking API caused a blocking event, a total amount of time that each API caused blocks, and the blocking class for each blocking API. Report 86 may be adjusted by a user to cover the entire period of execution of program 16 or one or more selected periods of execution of program 16. Report 86 may be adjusted by a user to show all threads 20(1)-20(M) of program 16 or one or more selected threads 20(1)-20(M) of program 16. Thread execution analyzer 12 adjusts the display of report 86 in response to user inputs that indicate the period or periods of execution and/or threads to be displayed.

With the above embodiments, thread execution analyzer 12 relies on context switch and callstack information to identify and analyze blocking events. By doing so, thread execution analyzer 12 may provide a user with information that identifies the source of inefficiencies in program 16 and allows the user to reduce or eliminate the inefficiencies.

Figure 7:
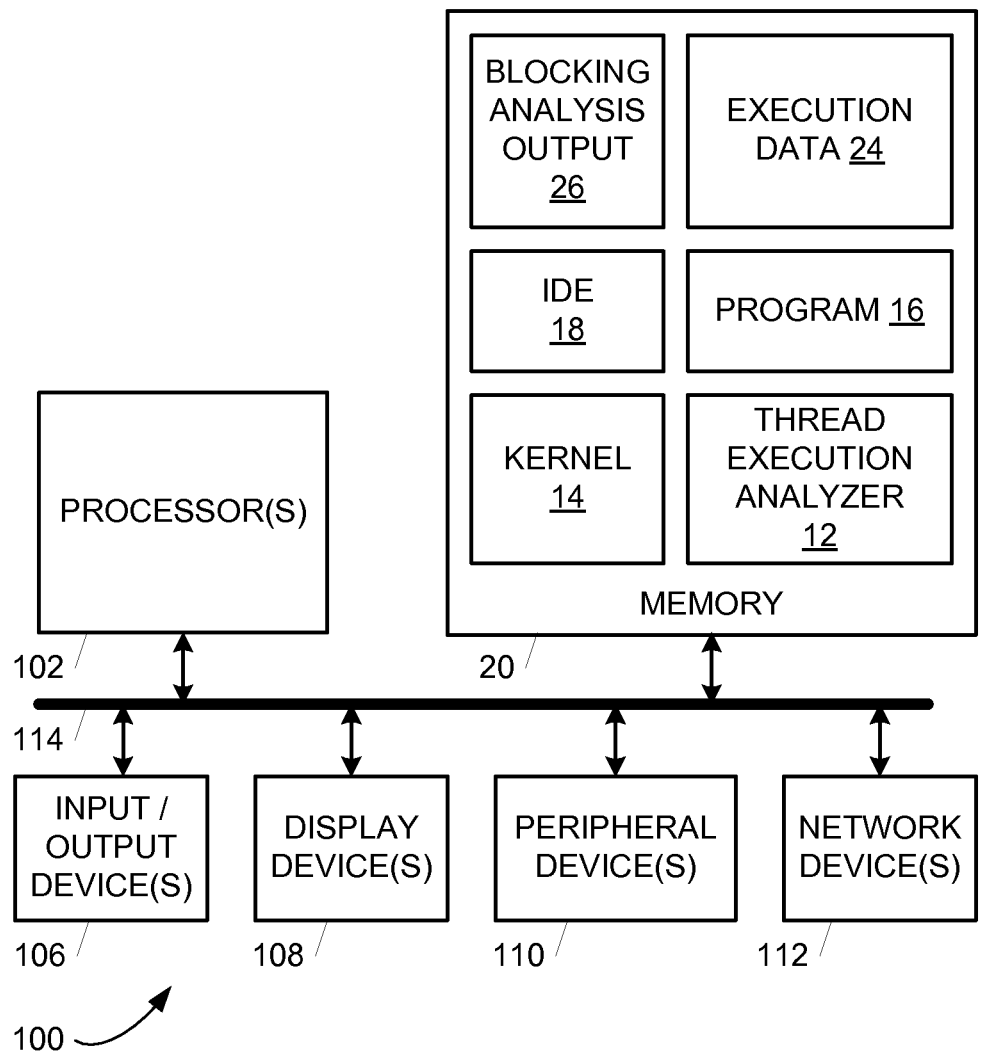
FIG. 7 is a block diagram illustrating an embodiment of a computer system configured to execute a thread execution analyzer.

FIG. 7 is a block diagram illustrating an embodiment of a computer system 100 configured to execute thread execution analyzer 12.

Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 each include one or more execution cores. Each execution core is configured to access and execute instructions stored in memory system 104. The instructions may include a basic input output system (BIOS) or firmware (not shown), thread execution analyzer 12, kernel 14, program 16, and IDE 18. Each execution core may execute the instructions in conjunction with or in response to information received from input/output devices 106, display devices 108, peripheral devices 110, and/or network devices 112.

Computer system 100 boots and executes kernel 14. kernel 14 includes instructions executable by execution cores to manage the components of computer system 100 and provide a set of functions that allow programs, including thread execution analyzer 12, program 16, and IDE 18, to access and use the components. kernel 14 and any additional runtime libraries generate a runtime environment (e.g., runtime environment 10 shown in FIG. 1) to allow thread execution analyzer 12, program 16, and IDE 18 to be executed. In one embodiment, kernel 14 is the Windows operating system. In other embodiments, kernel 14 is another operating system suitable for use with computer system 100.

Memory system 104 includes any suitable type, number, and configuration of volatile or non-volatile storage devices configured to store instructions and data. The storage devices of memory system 104 represent computer readable storage media that store computer-executable instructions including those shown in FIG. 7. The instructions are executable by computer system 100 to perform the functions and methods described herein. Memory system 104 stores instructions and data received from processor packages 102, input/output devices 106, display devices 108, peripheral devices 110, and network devices 112 including execution data 24 and blocking analysis output 26. Memory system 104 provides stored instructions and data to processor packages 102, input/output devices 106, display devices 108, peripheral devices 110, and network devices 112. Examples of storage devices in memory system 104 include hard disk drives, random access memory (RAM), read only memory (ROM), flash memory drives and cards, and magnetic and optical disks.

Input/output devices 106 include any suitable type, number, and configuration of input/output devices configured to input instructions or data from a user to computer system 100 and output instructions or data from computer system 100 to the user. One or more input/output devices 106 may be configured to allow a user to interact with thread execution analyzer 12, kernel 14, program 16, and/or IDE 18. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. One or more display devices 108 may be configured to output visual format 70 (shown in FIG. 6) to a user. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may be configured to allow execution data 24 and/or blocking analysis output 26 to be transmitted to or received from another computer system (not shown) or storage device (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a computer system, the method comprising:
    analyzing a first context switch data of a first thread of a program, the first context switch data stored in response to a first blocking event corresponding to the first thread;
    correlating the first blocking event with a first one of a plurality of blocking classes using the first context switch data; and
    providing a first indication of the first thread, the first blocking event, and the first one of the plurality of blocking classes as part of a blocking analysis output.

2. The method of claim 1 further comprising:
    matching a stack frame in a callstack in the first context switch data to a known blocking application programming interface (API) signature; and
    associating the known blocking API signature with the first one of the plurality of blocking classes.

3. The method of claim 2 further comprising:
performing symbol resolution on the stack frame prior to matching the stack frame to the known blocking API signature.

4. The method of claim 2 further comprising:
providing a second indication of the known blocking API signature as part of the blocking analysis output.

5. The method of claim 1 wherein the first indication includes a graphical timeline with an execution period and a first blocked period corresponding to the first blocking event.

6. The method of claim 5 wherein a first color of the blocked period corresponds to the first one of the plurality of blocking classes.

7. The method of claim 6 further comprising:
analyzing a second context switch data of the first thread, the second context switch data stored in response to a second blocking event corresponding to the first thread;
correlating the second blocking event with a second one of a plurality of blocking classes using the second context switch data; and
providing a second indication of the first thread, the second blocking event, and the second one of the plurality of blocking classes as part of the blocking analysis output.

8. The method of claim 7 wherein the graphical timeline includes a second blocked period corresponding to the second blocking event, and wherein a second color of the blocked period corresponds to the second one of the plurality of blocking classes.

9. The method of claim 1 further comprising:
analyzing a second context switch data of a second thread of the program, the second context switch data stored in response to a second blocking event corresponding to the second thread;
correlating the second blocking event with a second one of a plurality of blocking classes using the second context switch data; and
providing a second indication of the second thread, the second blocking event, and the second one of the plurality of blocking classes as part of the blocking analysis output.

10. A method performed by a computer system, the method comprising:
employing at least one processor configured to execute computer-executable instructions stored in memory to perform the following acts:
generating first and second thread execution analyses that correspond to first and second threads, respectively; and
displaying first and second representations of the first and the second thread execution analyses, each of the representations including one or more respective execution periods, one or more respective blocking periods, and respective indications of one of a plurality of blocking classes for each blocking period.

11. The method of claim 10 further comprising:
detecting a known blocking application programming interface (API) corresponding to one of the blocking periods of the first thread; and
displaying the known blocking API as part of the first representation.

12. The method of claim 11 further comprising:
displaying the known blocking API as part of a tool tip in response to an input from a user.

13. The method of claim 11 further comprising:
displaying a graph indicating delay times for each of the plurality of blocking classes for the first thread.

14. The method of claim 11 further comprising:
displaying a listing of application programming interfaces (API) that correspond to the blocking periods of the first and the second threads.

15. A computer-readable storage medium storing computer-executable instructions that, when executed by a computer system, perform a method comprising:
executing a program including at least one thread;
storing execution data including a callstack corresponding to the thread in response to detecting a context switch of the thread;
matching a stack frame of the callstack in the execution data to a known blocking application programming interface (API) signature;
correlating the context switch with one of a plurality of blocking classes, indicative of categories of blocking causes, associated with the known blocking API signature; and
providing a first indication of the thread, the context switch, and the one of the plurality of blocking classes as part of a blocking analysis output.

16. The computer-readable storage medium of claim 15, the method further comprising:
performing symbol resolution on the stack frame prior to matching the stack frame to the known blocking API signature.

17. The computer-readable storage medium of claim 15, the method further comprising:
providing a second indication of the known blocking API signature as part of the blocking analysis output.

18. The computer-readable storage medium of claim 17, the method further comprising:
providing a third indication of a line number corresponding to the known blocking API signature in the program.

19. The computer-readable storage medium of claim 15, the method further comprising:
adjusting a display of the first indication in response to a user inputs that indicates one of a period of execution or the thread.

20. The computer-readable storage medium of claim 15, the method further comprising:
displaying the one of the plurality of blocking classes as part of a tool tip in response to an input from a user.

* * * * *